United States Patent
Ormesher et al.

(10) Patent No.: US 7,030,805 B2
(45) Date of Patent: Apr. 18, 2006

(54) METHODS AND SYSTEM SUPPRESSING CLUTTER IN A GAIN-BLOCK, RADAR-RESPONSIVE TAG SYSTEM

(75) Inventors: Richard C. Ormesher, Albuquerque, NM (US); Robert M. Axline, Albuquerque, NM (US)

(73) Assignee: SANDIA Corporation, Albuquerque, NM (US)

(*) Notice: Subject to any disclaimer, the term of this patent is extended or adjusted under 35 U.S.C. 154(b) by 131 days.

(21) Appl. No.: 10/898,119

(22) Filed: Jul. 23, 2004

(65) Prior Publication Data

US 2006/0017608 A1    Jan. 26, 2006

(51) Int. Cl.
*G01S 13/74* (2006.01)

(52) U.S. Cl. .......................................... 342/42; 342/51
(58) Field of Classification Search .................... 342/42
See application file for complete search history.

(56) References Cited

U.S. PATENT DOCUMENTS

| | | | |
|---|---|---|---|
| 5,486,830 A * | 1/1996 | Axline et al. .................. 342/43 |
| 5,657,022 A * | 8/1997 | Van Etten et al. ........... 342/104 |
| 6,222,933 B1 * | 4/2001 | Mittermayer et al. ....... 382/109 |
| 6,329,944 B1 * | 12/2001 | Richardson et al. .......... 342/42 |
| 6,396,866 B1 * | 5/2002 | Upton et al. ................. 375/139 |
| 6,577,266 B1 * | 6/2003 | Axline .......................... 342/42 |
| 6,791,489 B1 * | 9/2004 | Richardson et al. .......... 342/43 |
| 6,870,501 B1 * | 3/2005 | Beard .......................... 342/45 |

* cited by examiner

*Primary Examiner*—Thomas H. Tarcza
*Assistant Examiner*—Matthew Barker
(74) *Attorney, Agent, or Firm*—Elmer A. Klavetter

(57) ABSTRACT

Methods and systems reduce clutter interference in a radar-responsive tag system. A radar transmits a series of linear-frequency-modulated pulses and receives echo pulses from nearby terrain and from radar-responsive tags that may be in the imaged scene. Tags in the vicinity of the radar are activated by the radar's pulses. The tags receive and remodulate the radar pulses. Tag processing reverses the direction, in time, of the received waveform's linear frequency modulation. The tag retransmits the remodulated pulses. The radar uses a reversed-chirp de-ramp pulse to process the tag's echo. The invention applies to radar systems compatible with coherent gain-block tags. The invention provides a marked reduction in the strength of residual clutter echoes on each and every echo pulse received by the radar. SAR receiver processing effectively whitens passive-clutter signatures across the range dimension. Clutter suppression of approximately 14 dB is achievable for a typical radar system.

23 Claims, 4 Drawing Sheets

METHODS AND SYSTEM SUPPRESSING CLUTTER IN A GAIN-BLOCK, RADAR-RESPONSIVE TAG SYSTEM

STATEMENT OF GOVERNMENT INTEREST

The U.S. Government has rights in this invention pursuant to Contract DE-AC04-94AL85000 between Sandia Corporation and the U.S. Department of Energy.

FIELD OF THE INVENTION

The present invention is generally related to radar-responsive tag systems. More particularly, the present invention is related to methods of achieving clutter suppression on each and every tag echo pulse processed by a radar system.

BACKGROUND

U.S. Pat. No. 6,577,266, issued Jun. 10, 2003 to Axline et al entitled "Transponder Data Processing Methods and Systems," and U.S. Pat. No. 5,486,830, issued Jan. 23, 1996 to Axline entitled "Radar Transponder Apparatus and Signal Processing Technique," provide background for an in-band tag system and the present invention. These patents are herein incorporated by reference into the current specification for their teachings.

During operation, a tag receives pulses from the radar, modulates and amplifies these pulses, and returns the pulses without changing the pulses' center frequencies. Because echoes from passive terrain also return to the radar at about this same center frequency and at about the same time as the tag's echo, the passive echoes can interfere with the radar's ability to detect the tag and decode data up-linked from the tag. Passive terrain echoes can be referred to as clutter due to the fact that they are not desirable and serve only to reduce our ability to process the desired echoes coming from the tag. Therefore, some method of attenuating or suppressing these clutter echoes is desired.

As described in the '830 patent, one method to suppress clutter is to impart an interpulse (i.e., pulse-to-pulse) phase code to the tag's echo. Subsequent 'azimuth' or 'Doppler' processing in the radar can then preferentially enhance the tag's signature by reducing the amount of clutter power present in the processed signal. This clutter suppression can be of the order of a factor of 10 dB or more, its size depending upon the design details of the radar, its antenna, and the velocity at which the radar platform moves as the radar transmits and collects echo pulses from the terrain and from the tag or tags in the illuminated scene. In order to accomplish the suppression of clutter as described in the '830 patent, the radar must process, or integrate, many tag echo pulses. That is, the aforementioned method does not achieve any clutter suppression on a single pulse.

The '830 patent teaches in detail how an airborne synthetic aperture radar (SAR) can command, image, geolocate, and receive uplinked data from a small, remotely located, battery-powered, radio-frequency transponder (herein referred to as a tag). A radar system can interact with the remote tag in either SAR or moving-target-indicator (MTI) modes of the radar. As described in the referenced patent, the passive clutter echo in the imaged scene can be suppressed through use of special pulse-to-pulse (or interpulse) modulation imparted by the tag to its retransmitted pulse and through use of special processing in the radar. This suppression of passive clutter enhances the signature of the tag in the pseudo-image of the tag formed by special processing in the radar.

The aforementioned method of clutter suppression, which is referred to as Doppler processing, or azimuth processing, can be effective in reducing clutter by 10 dB or more. That same method requires that the radar process (or integrate) many tag echo pulses in order to achieve the desired suppression. The exact amount of clutter suppression achieved depends upon the details of the radar-tag system design. The present inventors recognize that a need exists for a more robust clutter reduction process that is not so heavily dependent on integration of tag echo pulses.

SUMMARY OF THE INVENTION

According to methods of the present invention, clutter suppression can be easily achieved on each and every tag echo pulse processed by a radar system.

In accordance with a feature of the present invention, clutter suppression is achieved on each and every tag echo pulse processed by the radar wherein a new modulation imparted by a tag is applied to each and every echo pulse the tag returns to a radar system.

In accordance with another feature of the present invention, the method of the present invention has the tag modify each tag echo pulse by reversing the direction of the linear frequency modulation originally imparted to the radar pulse by the radar.

In accordance with yet another feature of the present invention, the radar processes the tag's echo using a reversed linear frequency 'de-ramp' reference pulse in order to correctly process the tag's echo.

In accordance with yet another feature of the present invention, a system for communicating between radar and tag devices is provided that includes a radar system adapted to transmit a radar signal including linear frequency modulations imparted on the at least one radar pulse, receive and process tag echo pulses transmitted from at least one tag in response to the radar system's transmission of the radar signal and process the tag echo pulses by employing a reversed-chirp de-ramp pulse in order to provide a de-ramp waveform that is matched to incoming tag echoes.

In accordance with yet another feature of the present invention, a system for communicating between radar and tag devices includes at least one tag that includes a tag receiver receiving radar pulse signals including the linear frequency modulations imparted on at least one radar pulse by a radar system transmitting the radar signals; a tag processor processing the radar pulse signals to reverse the direction, in time, of the received radar pulse signal's linear frequency modulation; and a tag transmitter for transmitting data from the tag, where the data is modulated, by the tag, onto the reversed-chirp waveform to be transmitted.

In accordance with yet another feature of the present invention, a method for locating and communicating with at least one tag is provided including the steps of transmitting a radar signal comprising linear frequency modulations from a radar system to a general geographic location containing at least one tag, said radar signal including linear frequency modulation imparted on the at least one radar pulse by the radar system for receipt by at least one tag, and receiving, at the radar system, tag echo pulses retransmitted from at least one tag in response to the radar system's transmission of the radar signal, wherein the radar system is adapted to produce a reversed-chirp de-ramp waveform in order to provide a de-ramp waveform that is matched to incoming tag echoes.

In accordance with yet another feature of the present invention, a radar processes at least one tag's echo pulses using a reversed linear frequency 'de-ramp' reference pulse in order to correctly process the at least one tag's echo pulses.

In accordance with yet another feature of the present invention, a method is provided for suppressing clutter during communication between a radar system and tag devices wherein the radar system is adapted to transmit a radar signal including linear frequency modulation imparted on the at least one radar pulse, receive and process tag echo pulses transmitted from at least one tag in response to the radar system's transmission of the radar signal and process tag echo pulses by employing a reversed-chirp de-ramp pulse in order to provide a de-ramp waveform that is matched to incoming tag echoes, the method including the steps of: using the radar system to transmit a radar signal including linear frequency modulations imparted on the at least one radar pulse by the radar system for receipt by at least one tag, wherein the radar system is adapted for processing the tag echo and; using the radar system to receive and process tag echo pulses transmitted from at least one tag in response to the radar system's transmission of the radar signal; and using the radar system to process the at least one tag's echo pulses using a reversed linear frequency 'de-ramp' reference pulse in order to correctly process the at least one tag's echo pulses and obtain data transmitted by the tag.

In accordance with yet another feature of the present invention, a program product is provided for communicating between radars and tag devices, wherein said program product resides in memory associated with a radar. The program product includes a module for producing radar transmit pulses including linear frequency modulations, transmitting the radar signal, producing a reverse-chirped receiver de-ramp pulse for use in processing tag echoes, processing the tag echoes to detect the presence of the tag in the received signals and decoding data contained in the tag echoes.

In accordance with yet another feature of the present invention, the program product resides in memory associated with a coherent gain-block tag and includes a module for processing received radar signals to reverse the direction, in time, of the signals' linear frequency modulation; to delay, by a specified time epoch, prior to transmission, by the tag, of a response pulse; to impress data onto the modified signal, and to retransmit the signal with the intent that the signal be received by a radar.

BRIEF DESCRIPTION OF THE DRAWING

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENTS

Figure 1:
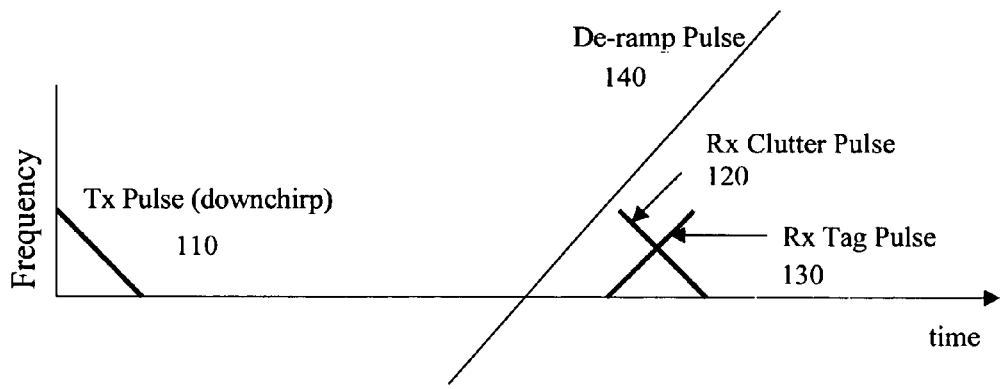
FIG. 1 illustrates a graph plotting frequency vs. time for transmitted and received radar pulses.

The new modulation disclosed herein is a specific form of intrapulse modulation—the internal characteristics of each separate echo pulse are modified by the tag. The modulation method of the original, aforementioned '830 patent only changed the electrical phase of each echo pulse by a constant amount. The method of the present invention modifies each tag echo pulse by reversing the direction of the linear frequency modulation originally imparted to the radar pulse by the radar prior to transmission of that same pulse. In order to correctly process the tag's echo, the radar processes the tag's echo using a reversed linear frequency 'de-ramp' reference pulse.

What is described in detail herein is a new method of obtaining clutter suppression with an in-band tag system. The present invention achieves approximately 15 dB of clutter suppression on each and every tag echo pulse returned to the radar. The Reverse-Chirp Algorithm that is herein presented applies to radars that transmit linear-frequency-modulated (LFM), or chirped pulses. Unlike the method described in the '830 patent, the present invention has the responding tag impart an intrapulse (i.e., within each pulse) modulation to its echo. With the present invention, its inventors consider the case of a SAR/MTI radar that transmits a linear-frequency-modulated (LFM) pulse. In such a radar, the instantaneous frequency of the transmitted pulse is varied, in a linear fashion, across the time extent of the pulse.

Clutter suppression has been achieved because the present inventors designed the tag in such a way that it reverses the direction of the LFM of the radar pulse before transmitting it back to the radar. In processing these specially modulated tag echoes, the radar must generate a reference "de-ramp" signal that has the same chirp direction as that of the tag echoes. Although this special de-ramp signal is properly matched to the chirp direction of echoes coming from the tag, it is mismatched to echoes coming from passive terrain and other natural or cultural targets. Subsequently, in the radar, most of the passive clutter energy can be removed by analog filters resident in the radar's circuitry.

Implementation of this new method requires modifications both to the tag and to the radar's de-ramp pulse generation process in relation to the tag system described in the '830 patent. Therefore, this invention can be viewed as a novel extension or expansion of the set of claims contained in the '830 patent referring to the tag, the radar, and to the radar and tag taken together as a system.

The unique method in accordance with the present invention incorporates a method, which can be referred to herein as the Reverse-Chirp Algorithm, that reduces clutter interference in a signal retransmitted by a radar-responsive tag and received and processed by a chirped, pulsed, synthetic aperture radar (SAR). The algorithm applies to a radar system that is compatible with a coherent, gain-block tag. The tag system is based on the SAR-tag architecture described in the '830 patent. In this architecture, the radar transmits a pulse; a tag then receives the radar pulse, modulates and amplifies the pulse, and retransmits it back to the radar. The radar collects a series of the retransmitted pulses and performs coherent SAR-tag processing. A tag image (called a pseudo-image) is produced that can be used to provide relative location of the tag within the context of a normal SAR image. The normal SAR image is formed from the same set of radar pulses. In addition, the radar can process the retransmitted pulses to extract data from the tag.

The new Reverse-Chirp Algorithm method presents several advantages to previous methods of achieving clutter suppression. First, the operations the tag must perform on the received radar pulses are straightforward and involve very little processing. Second, the operations that the SAR must perform to process the received tag signal are extremely easy to implement in a modern, flexible SAR, such as the Sandia/General Atomics Lynx™ SAR. Processing of the tag's returns by the radar places essentially no additional burden on the SAR's signal processor. Third, unlike other methods that require the radar to integrate many pulses to achieve clutter attenuation, the present method suppresses unwanted clutter on each and every pulse returned by the tag to the radar. Fourth, the amount of clutter suppression achieved on each and every pulse by this method is significant, being approximately 15 dB. Fifth, radar processing matched to the tag's reversed-chirp transmission whitens the passive clutter energy along the range dimension. This tends to break up passive signatures of any large natural or cultural scatterers that may be present in the imaged scene.

The method described herein applies to four specific variations of a coherent gain-block tag system. For all four variations, the coherent gain-block tag system uses a signaling scheme whereby the tag receives a radar signal, delays the signal by at least the time-length of the transmitted radar pulse, and retransmits the delayed radar signal. If the tag delay is chosen to be short (that is, only slightly longer than the length of the radar pulse), the radar can coherently combine tag returns resulting from many pulses transmitted by the SAR. This coherent combination (also called azimuth processing) amounts to a summation of tag returns, in azimuth (also called slow time) over a time period equivalent to the length of a SAR aperture.

The first variation of the coherent gain-block system has the tag responding, after a very short time delay, to the radar on every pulse transmitted by the radar. The second variation of the system has the tag responding, after a very short time delay, to the radar on every other pulse (that is, on alternate pulses). The third and fourth variations of the system have the tag delaying its transmission by a length of time equal to the radar's pulse-repetition interval.

Referring to FIG. 1, the basic concept of the present clutter suppression method is graphically illustrated. FIG. 1 shows the frequency and time relationship of a transmitted radar pulse 110, a received radar pulse from a single clutter cell 120, and a received radar pulse from a tag 130. The transmitted pulse 110 is a negatively chirped pulse, where a negatively chirped pulse 110 is defined as a chirped pulse where the instantaneous frequency decreases linearly as time increases. The normal passive radar return 120 from the scene clutter is also a negatively chirped pulse. However the return signal from the tag 130 is a positively chirped pulse. Finally, the SAR's de-ramp pulse 140 is also a positively chirped signal. The main effect of the algorithm embodied within software processed through a radar system in accordance with the present invention is to compress the tag's return into a single range cell while at the same time spreading out (or whitening) the clutter energy in the range dimension, thereby increasing the ratio of signal power to clutter power for the range-compressed tag response.

Figure 2:
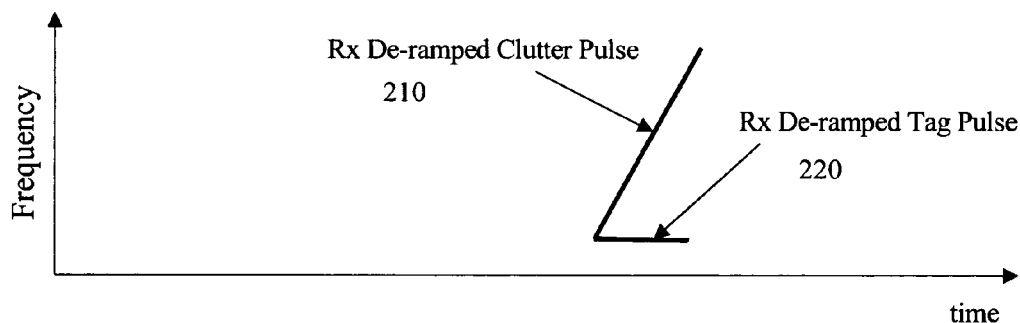
FIG. 2 illustrates a graph of a de-ramped, received radar pulse.

In a chirped radar system, the de-ramp reference pulse is mixed, using a well known method, with the received radar pulse to produce a continuous-wave pulse. Referring to FIG. 2, what is shown is the result of mixing received radar pulses with the positively chirped de-ramp reference function. After the mixing operation, the clutter return pulse 210 is still a chirp pulse, while the tag return 220 has been converted to a CW pulse.

Figure 3:
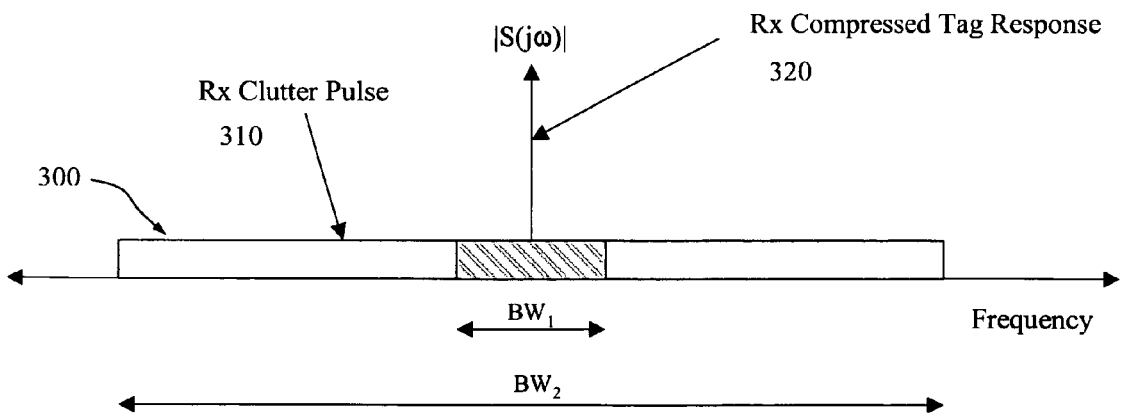
FIG. 3 illustrates a graph of the power spectrum of de-ramped and compressed radar pulses.

The next step in the radar signal processing is to perform a range-dimension Fast Fourier Transform (FFT) to compress the radar return signal into a point target within a range resolution cell. FIG. 3 illustrates the power spectrum of a compressed tag response pulse 320 and of the uncompressed clutter response pulse 310 resulting from the FFT operation. Following the range FFT operation, the compressed signal region has a total bandwidth indicated in FIG. 3 by the parameter $BW_1$. After the range FFT operation, the energy of the tag is integrated to produce a point-target response 320. The return signal from normal clutter, however, has been spread out in frequency such that most of the clutter energy has been removed from the bandwidth $BW_1$ (technically, referred to as the video bandwidth) of a normal compressed tag return. The bandwidth of the uncompressed clutter pulse is indicated by the parameter $BW_2$. Therefore, most of the energy from the clutter return lies outside the compressed signal bandwidth $BW_1$ and this clutter energy does not add to the denominator of the signal-to-clutter ratio of the compressed tag return.

Figure 4:
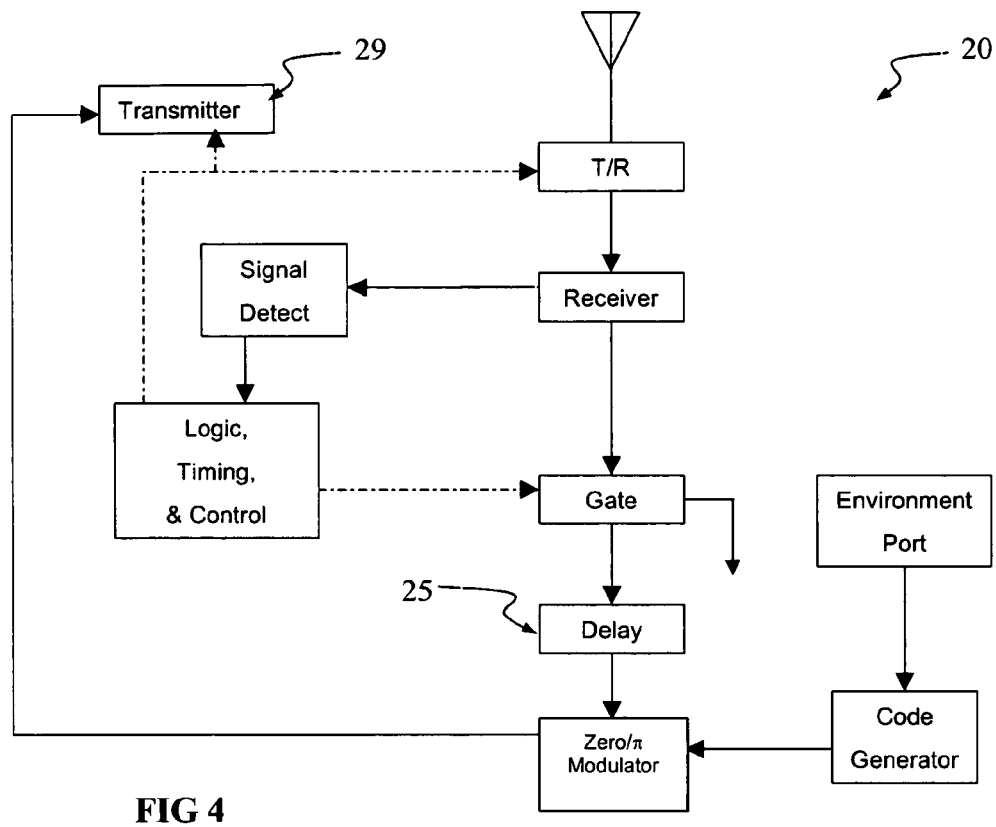
FIG. 4 illustrates a block diagram of a radar-responsive, gain-block tag as described in U.S. Pat. No. 5,486,830.

What will now be described is how the skilled in the art would implement the Reverse-Chirp Algorithm for a coherent, gain-block tag. Referring to FIG. 4, what is shown is a block diagram of a radar-responsive, gain-block tag as described in the '830 patent. To implement a coherent, gain-block tag of the current invention, the delay provided by the delay block 25 is required to be, typically, of the order of microseconds or tens of microseconds. For the present invention, the time-delay element is defined to be as long or longer than the time duration of the complete radar pulse. The time-delay element can be implemented with either an analog or a digital device. For the Reverse-Chirp Algorithm of the present invention, only a digital delay element is considered.

Figure 5:
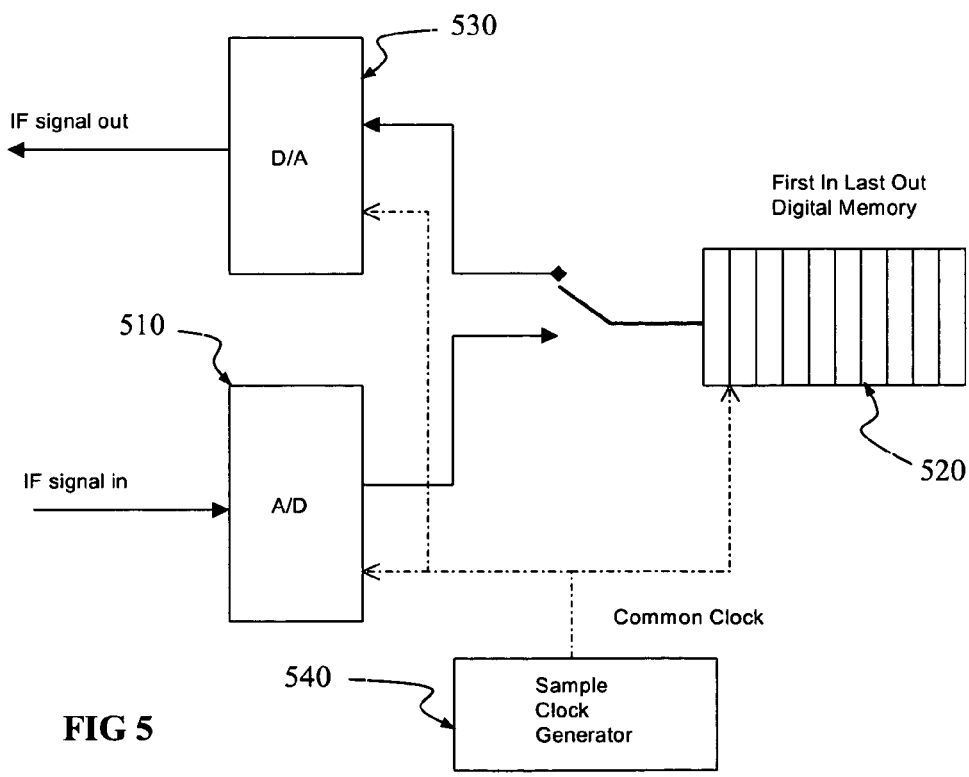
FIG. 5 illustrates a digital delay with first-in, last-out buffer to reverse the frequency sweep of a sampled chirped radar pulse.

To implement the Reverse-Chirp Algorithm, the tag response signal must be chirped in the opposite direction as that of the echoes returning from clutter cells in the imaged scene. One method to achieve this is by using a digital delay element. A block diagram of the digital delay element 500 for a coherent, gain-block tag is shown in the block diagram of FIG. 5. In this case, the IF signal is sampled by an analog-to-digital (A/D) converter 510 and stored into a digital memory 520. The digital signal stored in memory 520 is then clocked into the digital-to-analog (D/A) converter 530 and transmitted by the tag transmitter 29, from a tag 20 like that shown in FIG. 4.

The key to this approach is that the sampled signal is clocked out of the digital memory 520 in time-reversed order. This causes the frequency sweep of the chirped signal to change directions. At the radar (not shown), the de-ramp signal is configured to sweep in the same direction as the tag's response. After the range FFT operation, the tag response is compressed and the energy of the clutter echoes is spread out in frequency as shown graphically in FIG. 3.

It is important to understand that nearly all other functional aspects of the tag systems described in the Axline patents are retained in the enhanced radar/tag system design but are enabled by the new algorithm and methods described herein. 1) In particular, for a coherent, gain-block tag, the detailed diagram of the tag appears identical to that described in the '830 patent. 2) As was the case for the '830 patent, subsequent identical azimuth processing (following range processing) of tag and clutter echoes creates a pseudo-image wherein the tag's signature is discernable as a focused dot, and the clutter energy is spread across the azimuth dimension. The tag's focused dot can then be automatically detected within the pseudo-image. 3) The tag's true slant-range coordinate can be measured from the pseudo-image to an accuracy of tens of meters. 4) Because of the tag's unknown clock error, the apparent azimuth coordinate of the tag in the pseudo-image is, in general, not equal in value to the tag's true azimuth coordinate. 5) Therefore, without the use of additional methods, using methods of the present invention, the radar can estimate the tag's location to within approximately tens of meters in slant-range and to about the width of the radar antenna's ground footprint (order of hundreds of meters) in the imaged scene; this accuracy is inferior to geo-location accuracy obtained using the methods of the original patent '830. 6) In an identical manner to that of the '830 patent, the tag can send data messages to the radar, and the radar can accurately decode these messages to reveal their information content. 7) The primary advantage of the present invention is that the Reverse-Chirp Algorithm provides approximately a 15-dB reduction of clutter energy above and beyond the clutter rejection (order of 10 dB or higher) afforded by the '830 patent.

The first primary variation of the Reverse-Chirp Algorithm will now be described. In this variation, the tag responds (with a reversed chirp), after a delay slightly larger than the radar-pulse time-length, to each and every pulse transmitted by the radar, and the radar can form a pseudo-image of the tag. In this variation, the radar achieves clutter suppression in the pseudo-image from both range and azimuth processing. Also, in this variation, the radar has no means to form a normal image of the passive clutter scene.

The second primary variation of the Reverse-Chirp Algorithm will next be described. In this second variation, the tag responds only to alternate radar pulses, in each case, with a delay slightly larger than the radar-pulse time-length. Suppose the tag responds on even-numbered pulses and does not respond on odd-numbered pulses. Then the radar is able to form a tag pseudo-image from the aperture of even-numbered pulses and form a normal passive-clutter image from the aperture of odd-numbered pulses. This allows the radar operator to determine the location of the tag within the context of the normal passive-clutter image.

Figure 6:
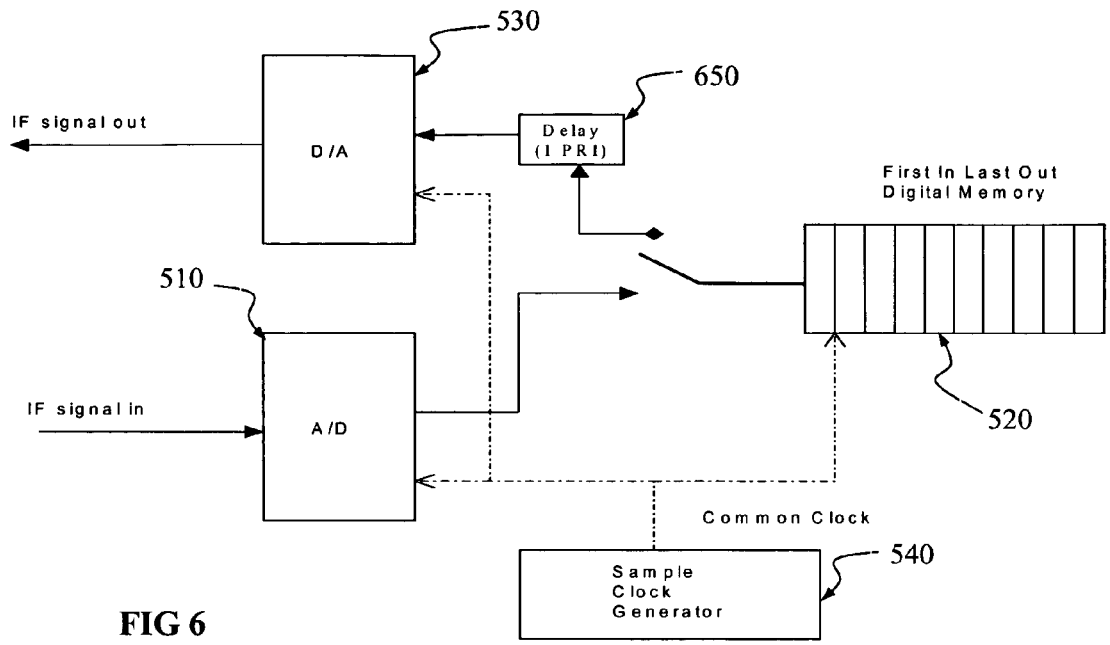
FIG. 6 illustrates a modified digital delay to match the radar's pulse repetition interval (PRI).

The third primary variation of the Reverse-Chirp Algorithm is now described. In this variation, the tag receives and samples every other radar pulse, delays for a time interval equal to the radar's PRI, and then transmits a reversed-chirp waveform back to the radar. Therefore, for this variation, the tag transmits only on every other pulse. Referring to FIG. 6, what is illustrated is how the digital-delay block is modified so that the total delay equals the radar's PRI. In this third primary variation of the Reverse-Chirp Algorithm, as for the previous system variations considered, the radar always transmits a pulse with a negative chirp slope. Now suppose again that the tag responds on even-numbered pulses (with reversed chirps) and not on odd-numbered pulses. Then the radar de-ramp waveform is set to create a reverse-chirp (positive slope) de-ramp waveform on even pulses and a normal chirp (negative slope) de-ramp waveform on odd pulses. So even pulses are processed as shown in FIG. 1, and odd pulses are processed using standard SAR/GMTI processing. For this system variation, as with the first and second variations, clutter suppression of about 15 dB is obtained on tag-response pulses. For this third variation, the number of azimuth pulses that can be integrated will be limited by the phase-noise characteristics of the tag's master clock oscillator so that, in some cases, only a small number of azimuth pulses may be coherently integrated. Integration of fewer pulses degrades the achievable azimuth resolution of the pseudo-image, so the ability to integrate a large number of azimuth pulses is preferred.

Figure 7A:
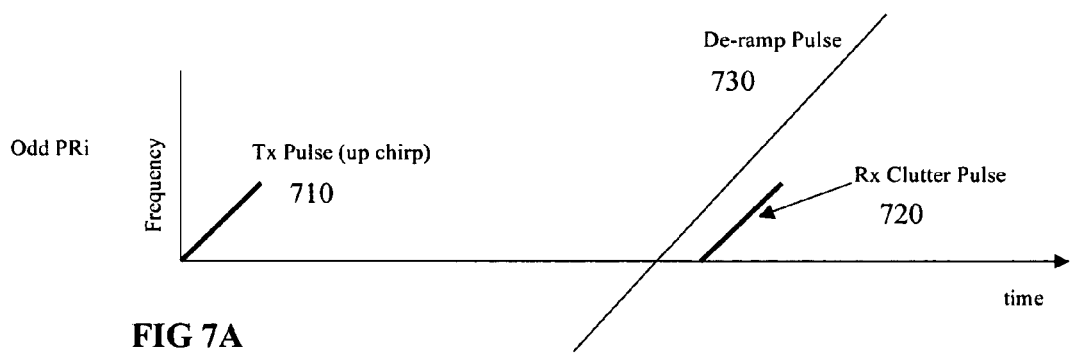
FIG. 7 illustrates a frequency-time plot showing radar transmit pulses and de-ramp signals for even and odd radar pulses.
Figure 7B:
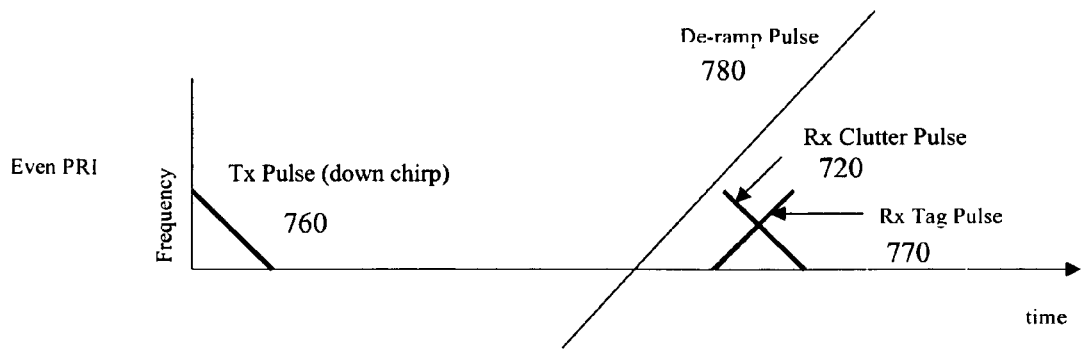

The fourth primary variation of the Reverse-Chirp Algorithm will now be described. Again, it is assumed that a gain-block tag is receiving and transmitting on every other radar pulse. In such a case, the tag receives the radar pulse, stores the pulse for a delay equal to the radar's PRI, and retransmits the stored radar pulse. For this variation, the tag transmits the radar pulse so that the chirp direction is not reversed. FIG. 7A illustrates a process wherein the tag stores the radar pulse on the odd PRI and transmits the stored radar pulse during the even PRI. The frequency-time plot for the odd PRI in FIG. 7A illustrates the normal radar signal scheme. In this case, the radar transmits a positive chirp pulse, receives a positive chirp return, and uses a positive chirped de-ramp signal. For the even PRI illustrated in FIG. 7B, however, the radar's signal processor is modified to perform the reverse-chirp operation. As illustrated in the frequency-time plot for the even PRI in FIG. 7B, on the even pulses, the radar transmits a negative chirp pulse but uses a positive chirp for the de-ramp signal. Also, notice that the tag transponds the previously sampled positive chirp. Therefore, the de-ramp signal is matched to the tag's response. After the range-FFT operation, a compressed tag response is achieved while the return from the clutter cell is spread out in range and attenuated, as shown in FIG. 3. As for the third variation of the Reverse-Chirp Algorithm, the radar can form both pseudo- and normal (passive clutter) images, and the number of azimuth pulses that may be integrated will be limited by the tag's master clock oscillator.

Clutter-suppression performance of the Reverse-Chirp Algorithm will now be described. The performance metric is defined as the difference in signal-to-clutter ratio between a tag's processed response with no clutter suppression and the tag's processed response with clutter suppression. For a normal range-compressed tag return, the signal-to-clutter ratio is defined as the ratio of the tag's signal power to the total clutter power from a single clutter cell. The clutter power from a single cell is proportional to $$\sigma_0 \delta A_c, \quad (1)$$

where $\sigma_0$ is the scattering coefficient of the terrain (assumed, for simplicity, to be uniform over the imaged scene) and $\delta A_c$ is the differential clutter cell area. The signal-to-clutter ratio is then, $$\sigma_t/(\sigma_0 \delta A_c). \quad (2)$$

In the foregoing equation, the numerator, $\sigma_t$, is the effective radar cross section of the transponding tag (units of area).

Now the clutter power within a tag resolution cell is considered when the Reverse-Chirp Algorithm is applied. First, as can be seen from FIG. 3, most of the clutter energy has been spread out, in frequency, and lies outside the bandwidth of the range-compressed signal. It is more desirable, however, to determine the average clutter power within a resolution cell. First, define the total clutter power as:

$$N_c = \Sigma \sigma_0 \delta A_c, \quad (3)$$

where the summation is over all resolution cells in the processed scene, and wherein we assume that each resolution cell has the same value of scattering coefficient. Next, the amount of clutter power that resides in the compressed signal's bandwidth can be considered. Again from FIG. 3, it can be seen that the total clutter power in the compressed signal's bandwidth is reduced by the ratio of the spreading bandwidth, $BW_2$ to the compressed signal bandwidth, $BW_1$. The signal-to-clutter ratio, after applying the Reverse-Chirp Algorithm, is now, $$\sigma_t/(BW_1/BW_2\sigma_0\delta A_c). \quad (4)$$

Comparing signal clutter ratios, the clutter suppression ratio defined as:

$$BW_2/BW_1 \quad (5)$$

(which is a number greater than one).

Figure 8:
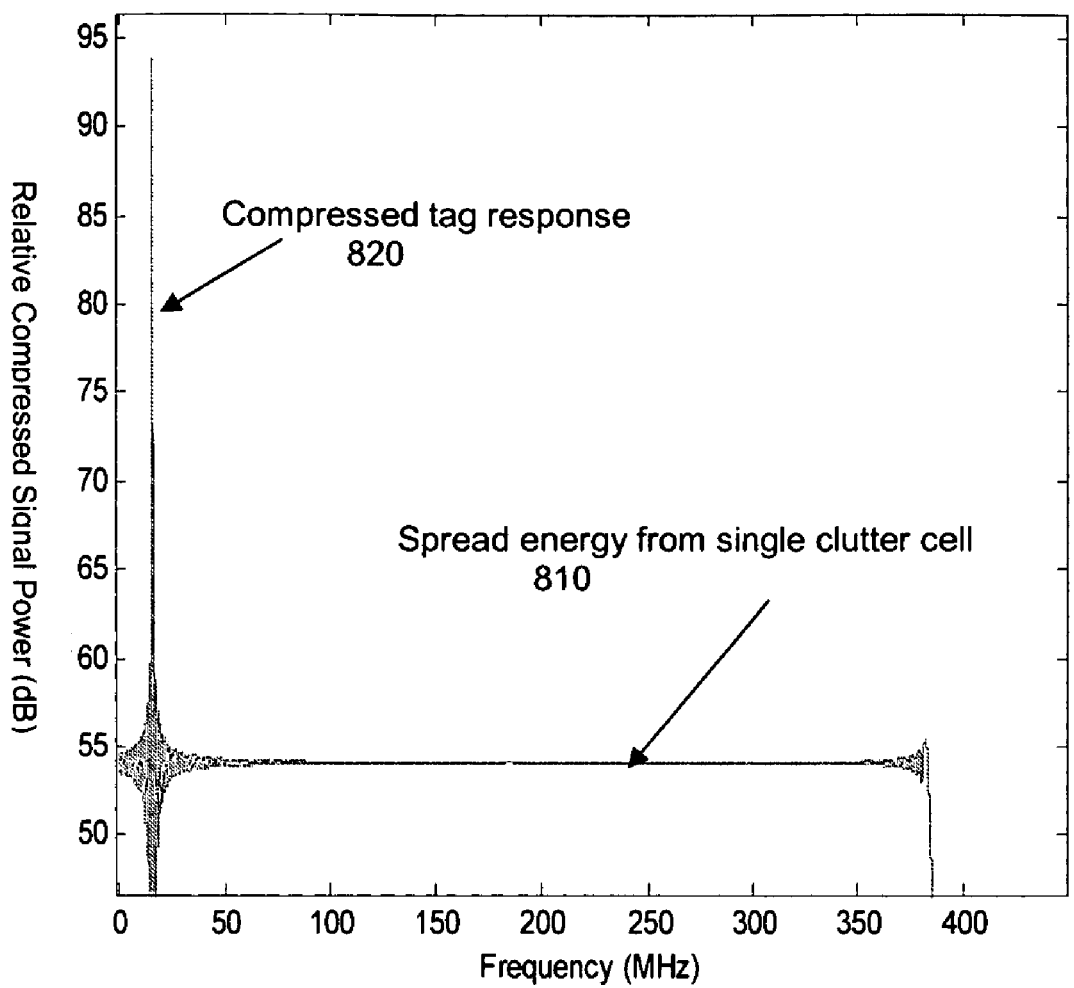
FIG. 8 illustrates a graphical example of a simulated tag response.

Referring to FIG. 8, illustrated are results of a simulation demonstrating the effectiveness of the above-described algorithm. In this example, the radar generates a chirped pulse with a bandwidth of 400 MHz ($BW_2/2$), pulse width of 40 µs, and resulting range resolution of approximately 3 feet. For the SNL/General Atomics Lynx radar design, the bandwidth of the compressed radar signal for this case would be is 30 MHz ($BW_1$). From FIG. 8, it can be seen that the clutter, from a single resolution cell, is down approximately 40 dB from the tag's response. Assuming a constant scattering coefficient over all resolution cells, then, the total clutter suppression is approximately, $$10 \log_{10}(BW_2/BW_1) \approx 14.3 \text{ dB}. \quad (6)$$

The invention is simple to implement with respect to operations that both the tag and the SAR must perform on the radar pulses in order to achieve clutter suppression. It can be appreciated given the foregoing processes can be carried out in tags and radar system using software programs. A program product can be provided for communicating between radars and tag devices, wherein said program product resides in memory associated with a radar. The program product includes a module for producing radar transmit pulses including linear frequency modulations, transmitting the radar signal, producing a reverse-chirped receiver de-ramp pulse for use in processing tag echoes, processing the tag echoes to detect the presence of the tag in the received signals and decoding data contained in the tag echoes.

A second program product can be provided for communication between radars and tag devices, wherein said program product resides in memory associated with a coherent gain-block tag and includes a module for processing received radar signals to reverse the direction, in time, of the signals' linear frequency modulation; to delay, by a specified time epoch, prior to transmission, by the tag, of a response pulse; to impress data onto the modified signal, and to retransmit the signal with the intent that the signal be received by a radar.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A method for locating and communicating with at least one tag, said method comprising the steps of:

transmitting a radar signal comprising linear frequency modulations from a radar system to a general geographic location containing at least one tag, said radar signal including linear frequency modulation imparted on at least one radar pulse by the radar system for receipt by at least one tag; and receiving, at said radar system, tag echo pulses retransmitted from at least one tag in response to the radar system's transmission of the radar signal, wherein the radar system is adapted to produce a reversed-chirp de-ramp waveform in order to provide a de-ramp waveform that is matched to incoming tag echoes.

2. The method of claim 1 further comprising the step wherein the radar processes the at least one tag's echo pulses using a reversed linear frequency 'de-ramp' reference pulse in order to correctly process the at least one tag's echo pulses.

3. The method of claim 2 wherein said tag echo pulses include at least one of geolocation sequences and environmental information data set.

4. The method of claim 2 wherein said tag echo pulses comprises environmental information.

5. The method of claim 2 wherein said tag echo pulses comprises geolocation sequences.

6. The method of claim 1 further comprising the step of processing said tag echo pulses to determine environmental information and/or tag internal data associated with said tag's geographic location.

7. A method for suppressing clutter during communication between a radar system and tag devices, said radar system adapted to transmit a radar signal including linear frequency modulation imparted on at least one radar pulse, receive and process tag echo pulses transmitted from at least one tag in response to the radar system's transmission of the radar signal and process tag echo pulses by employing a reversed-chirp de-ramp pulse in order to provide a de-ramp waveform that is matched to incoming tag echoes; said method comprising the steps of:

using the radar system to transmit a radar signal including linear frequency modulations imparted on the at least one radar pulse by the radar system for receipt by at least one tag, wherein the radar system is adapted for processing the tag echo and;

using the radar system to receive and process tag echo pulses transmitted from at least one tag in response to the radar system's transmission of the radar signal; and using the radar system to process the at least one tag's echo pulses using a reversed linear frequency 'de-ramp' reference pulse in order to correctly process the at least one tag's echo pulses and obtain data transmitted by the tag.

8. A system for communicating between radar and tag devices, said system comprising a radar system adapted to transmit a radar signal including linear frequency modulations imparted on at least one radar pulse, receive and process tag echo pulses transmitted from at least one tag in response to the radar system's transmission of the radar signal and process the tag echo pulses by employing a reversed-chirp de-ramp pulse in order to provide a de-ramp waveform that is matched to incoming tag echoes.

9. The system of claim 8 including at least one tag, said tag further comprising:
- a tag receiver receiving radar pulse signals including the linear frequency modulations imparted on the at least one radar pulse by a radar system transmitting the radar signals;
- a tag processor processing said radar pulse signals to reverse the direction, in time, of the received radar pulse signal's linear frequency modulation; and
- a tag transmitter for transmitting data from said tag, where the data is modulated, by the tag, onto the reversed-chirp waveform to be transmitted.

10. The system of claim 9 wherein the radar processes the data transmitted by the tag transmitter using a reversed linear frequency 'de-ramp' reference pulse in order to correctly process the at least one tag's echo pulses.

11. The system of claim 9 wherein the data includes at least one of geolocation sequences and environmental information.

12. The system of claim 9 wherein the data comprises environmental information.

13. The system of claim 9 wherein the data further comprises geolocation sequences.

14. The system of claim 9 further comprising processing the data to determine environmental information and/or tag internal data associated with said tag's geolocation.

15. A system for communicating between radar and tag devices, said system comprising at least one tag, said tag comprising:
- a tag receiver receiving radar pulse signals including linear frequency modulations imparted on the at least one radar pulse by a radar system transmitting the radar signals;
- a tag processor processing said radar pulse signals to reverse the direction, in time, of the received radar pulse signal's linear frequency modulation and to delay, by a specified time epoch, prior to transmission, by the tag, of a response pulse; and
- a tag transmitter for retransmitting data from said tag, where the data is modulated, by the tag, onto the reversed-chirp waveform to be transmitted.

16. The system of claim 15 wherein the radar processes the data transmitted by the tag transmitter using a reversed linear frequency 'de-ramp' reference pulse in order to correctly process the at least one tag's echo pulses.

17. The system of claim 15 wherein the data includes at least one of geolocation sequences and environmental information.

18. The system of claim 15 wherein the data comprises environmental information.

19. The system of claim 15 wherein the data further comprises geolocation sequences.

20. The system of claim 15 further comprising processing the data to determine environmental information and/or tag internal data associated with said tag's geolocation.

21. The system of claim 15 including a radar system adapted to transmit a radar signal including linear frequency modulations imparted on the at least one radar pulse, receive and process tag echo pulses transmitted from at least one tag in response to the radar system's transmission of the radar signal and produce a reversed-chirp de-ramp waveform in order to provide a de-ramp waveform that is matched to incoming tag echoes.

22. A program product for communicating between radars and tag devices, wherein said program product resides in memory associated with a radar, said program product comprising:
- a module for producing radar transmit pulses including linear frequency modulations, transmitting the radar signal, producing a reverse-chirped receiver de-ramp pulse for use in processing tag echoes, processing the tag echoes to detect the presence of the tag in the received signals and decoding data contained in the tag echoes.

23. A program product for communicating between radars and tag devices, wherein said program product resides in memory associated with a coherent gain-block tag, said program product comprising:
- a module for processing received radar signals to reverse the direction, in time, of the signals' linear frequency modulation; to delay, by a specified time epoch, prior to transmission, by the tag, of a response pulse; to impress data onto the modified signal, and to retransmit the signal with the intent that the signal be received by a radar.

* * * * *